US012649415B2

(12) United States Patent
Scandarion

(10) Patent No.: US 12,649,415 B2
(45) Date of Patent: Jun. 9, 2026

(54) WARNING LIGHT FOR A TRUCK LIFT

(71) Applicant: Hana Scandarion, Akko (IL)

(72) Inventor: Hana Scandarion, Akko (IL)

( * ) Notice: Subject to any disclaimer, the term of this patent is extended or adjusted under 35 U.S.C. 154(b) by 0 days.

(21) Appl. No.: 19/032,411

(22) Filed: Jan. 20, 2025

(65) Prior Publication Data

US 2026/0131723 A1 May 14, 2026

Related U.S. Application Data

(60) Provisional application No. 63/550,618, filed on Feb. 7, 2024.

(51) Int. Cl.
| | |
|---|---|
| *B60Q 1/50* | (2006.01) |
| *B60Q 1/00* | (2006.01) |
| *B60Q 1/26* | (2006.01) |
| *F21S 43/20* | (2018.01) |
| *F21S 45/50* | (2018.01) |
| *F21V 23/04* | (2006.01) |
| *F21Y 115/10* | (2016.01) |

(52) U.S. Cl.
CPC ........... *B60Q 1/543* (2022.05); *B60Q 1/0088* (2013.01); *B60Q 1/2696* (2013.01); *F21S 43/2605* (2024.05); *F21S 45/50* (2018.01); *F21V 23/0492* (2013.01); *F21Y 2115/10* (2016.08)

(58) Field of Classification Search
CPC .... B60Q 1/0088; B60Q 1/2696; B60Q 1/543; F21S 45/50; F21S 43/2605
See application file for complete search history.

(56) References Cited

U.S. PATENT DOCUMENTS

| | | | | |
|---|---|---|---|---|
| 2,891,235 | A * | 6/1959 | Halpert .................... | G08B 5/38 |
| | | | | 340/331 |
| 6,431,728 | B1 * | 8/2002 | Fredericks ........... | B60Q 1/2696 |
| | | | | 362/240 |
| 7,674,013 | B2 * | 3/2010 | Leslie ..................... | F21V 23/04 |
| | | | | 362/249.05 |
| 7,918,596 | B2 * | 4/2011 | Frank ....................... | B60Q 1/32 |
| | | | | 362/241 |
| 10,400,980 | B2 * | 9/2019 | Hansen .................... | F21S 45/50 |

FOREIGN PATENT DOCUMENTS

EP 1645468 A2 * 4/2006 ................ F21V 5/04

* cited by examiner

*Primary Examiner* — Matthew J. Peerce

(57) ABSTRACT

There is described a warning light for a truck lift including a PCB pre-formed with a plurality of light emitting diodes (LEDs), a tilt switch, electric cables and battery contacts. The plurality of LEDs are positioned as two or more sets of LEDs, with the sets of LEDs positioned perpendicularly to the PCB. The warning light further includes a tub casing provided with a battery housing and a plurality of lenses; and the tub casing is integrated to form a single molded component housing the PCB and the pre-formed components therein. Further, the tub casing accommodating the battery housing, the plurality of lenses, and the PCB with pre-formed components is embedded into a cavity in an outer housing, thereby forming an integrated and replaceable single piece molded component. An open face of the tub casing is sealed by a gasket and a back cover attached to the outer housing.

7 Claims, 10 Drawing Sheets

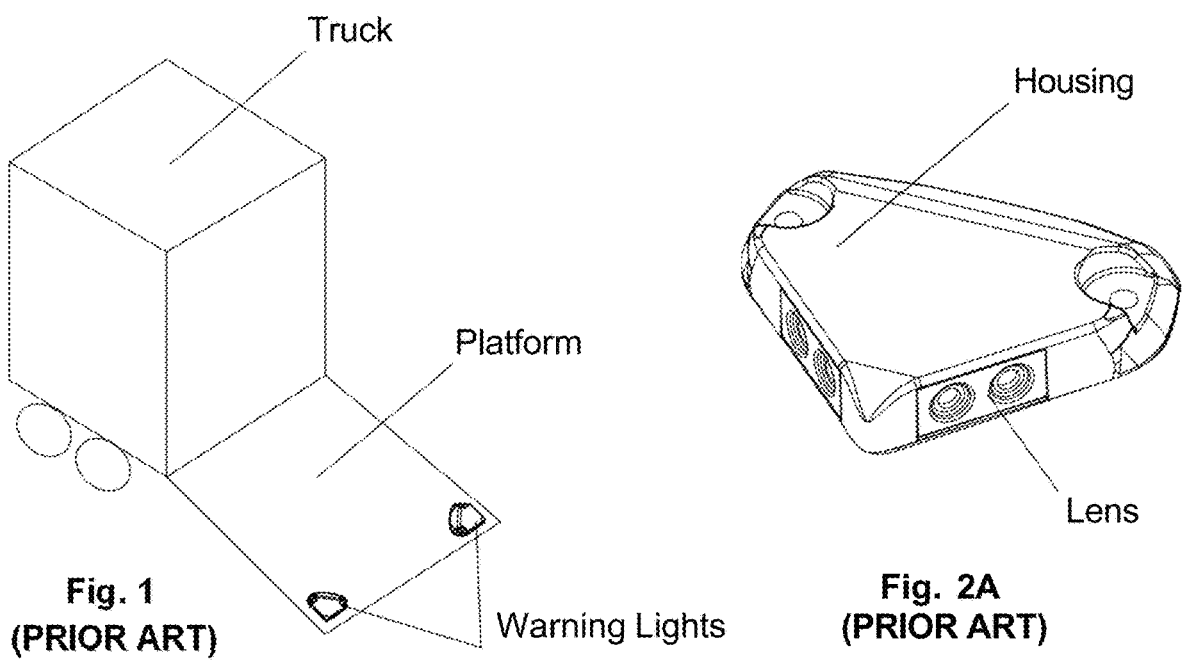
Truck
Platform
Housing
Lens
Warning Lights
Fig. 1
(PRIOR ART)
Fig. 2A
(PRIOR ART)
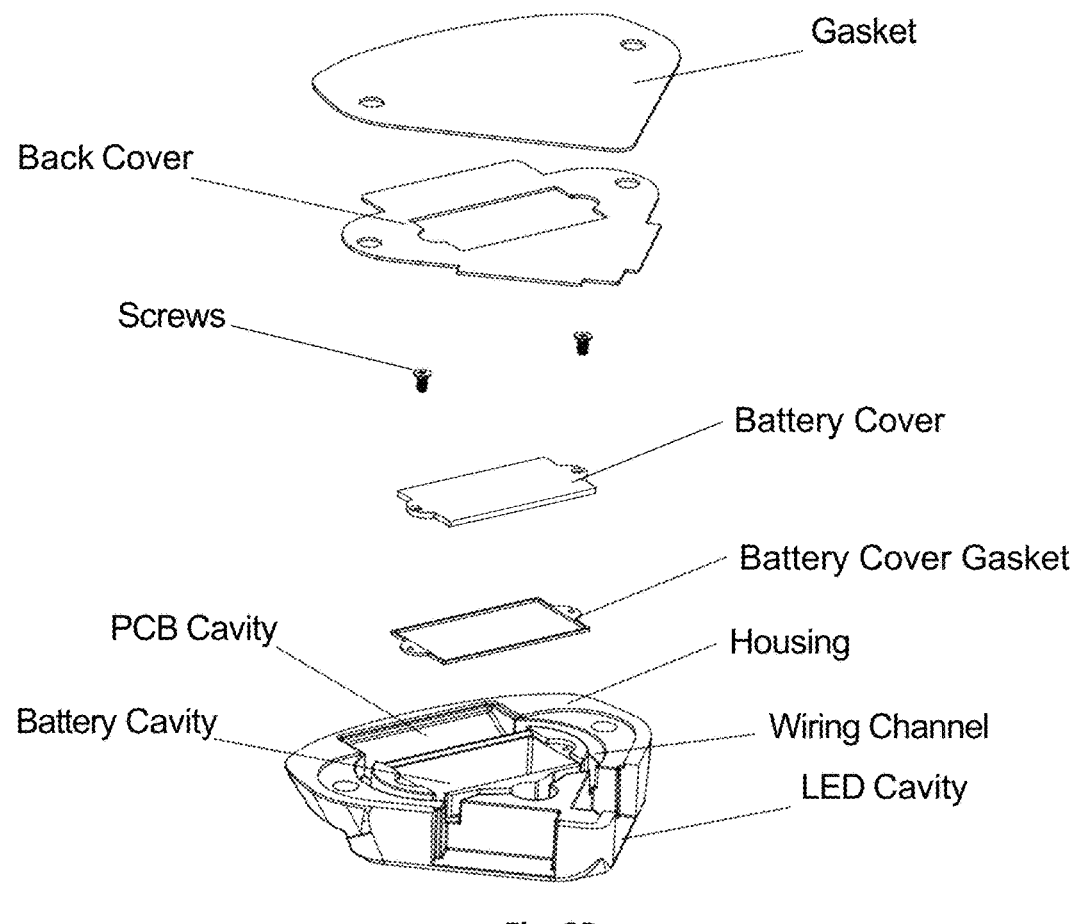
Gasket
Back Cover
Screws
Battery Cover
Battery Cover Gasket
PCB Cavity
Housing
Battery Cavity
Wiring Channel
LED Cavity
Fig. 2B
(PRIOR ART)

Pre-form PCB with electronics, LEDs and tilt switch (1202)

Insert PCB into designated cavity in casing (1204)

Insert batteries into designated cavity in casing (1206)

Insert casing into housing (1208)

Seal housing with gasket and back cover (1210)

Attach warning light to platform of truck lift (1212)

WARNING LIGHT FOR A TRUCK LIFT

CROSS-REFERENCE TO RELATED APPLICATIONS

This application claims priority of U.S. Provisional Patent Application No. 63/550,618 filed on Feb. 7, 2024, which is hereby incorporated by reference.

TECHNICAL FIELD

The subject invention, in some embodiments thereof, relates to a warning light and, more particularly, to a warning light for a truck lift.

BACKGROUND OF INVENTION

Truck lifts require warning lights to ensure the safety of pedestrians and vehicles in the vicinity of a truck lift when in use by warning the pedestrians and vehicles that the truck lift is being lowered and/or extended.

Current warning lights for truck lifts are low profile right angular metal casings with lights on two sides powered by a connection to the vehicle's battery, requiring expensive installation. Several battery powered options exist but mostly they require expensive non-standard batteries which are difficult to replace.

Referring to FIGS. 1, 2A and 2B, illustrated are different views of an exemplary embodiment of a warning light on a truck lift, as available in the prior art. Many conventional truck lift lights are powered by a connection to the vehicle battery requiring expensive installation. Alternatives independent battery powered lift warning lights exist, but they often use expensive non-standard batteries which are difficult to replace. Often, the LED light and/or controller are adhered to the metal, sealed, or entombed in resin (e.g., transparent epoxy resin). Many prior art warning lights are expensive to manufacture. The warning lights may include LED lights, a battery casing (made for example of opaque plastic), a PCB electronic board, a metal outer housing with a separate lens may be needed to cover and protect the LED's. In some cases, the LED's and/or the PCB may be entombed in epoxy. For example, manufacture may include connecting these components (e.g., by soldering wires connecting the LEDs to a PCB and the PCB to the battery housing). The PCB, LED's and battery may all be housed separately inside and/or mounted into the metal outer housing. The LED's and/or PCB may then be adhered to the metal, sealed, or entombed in resin (e.g., transparent epoxy resin). The metal cover seals the housing closed. Such systems may leak allowing water to destroy the electronic components and/or battery. Additional possible leaks include leaks between the LED lenses and the base and/or casing, leaks around the cover, leaks around the wire running between components, etc.

Therefore, in light of the foregoing discussion, there exists a need in the art to overcome the aforementioned drawbacks associated with the existing types and provide a warning light that offers a low profile, simple installation, and convenience of use, along with other significant advantages, forming a part of the subject invention, as described hereinbelow.

SUMMARY OF INVENTION

The subject invention seeks to provide a warning light. An aim of the present disclosure is to provide a solution that overcomes at least partially the problems encountered in the prior art.

In one aspect, an embodiment of the subject invention provides a warning light for a truck lift comprising:

a PCB pre-formed with a plurality of light emitting diodes (LEDs), a tilt switch, electric cables and battery contacts; said plurality of LEDs positioned as two or more sets of LEDs with said sets of LEDs positioned perpendicularly to said PCB;

a tub casing including a battery housing and a plurality of lenses; said tub casing integrated to form a single molded component housing said PCB and said preformed components therein;

said tub casing accommodating said battery housing, said plurality of lenses, and said PCB with said pre-formed components being embedded into a cavity in an outer housing, forming an integrated and replaceable single piece molded component; and an open face of said tub casing being sealed by a gasket and a back cover attached to said outer housing.

In another aspect, an embodiment of the subject invention provides a method for installation of a warning light for a truck lift, comprising the steps:

pre-forming a PCB with a plurality of light emitting diodes LEDs, a tilt switch, electric cables and battery contacts; said plurality of LEDs positioned as two or more sets of LEDs with said sets of LEDs positioned perpendicularly to said PCB;

housing said PCB and said pre-formed components therein into a tub casing including a battery housing and a plurality of lenses; thereby integrating to form a single molded component;

embedding said tub casing and integrated said battery housing, said plurality of lenses, and said PCB with said pre-formed components into a cavity in an outer housing, thereby forming an integrated and replaceable single piece molded component; and sealing an open face of said tub casing by a gasket and a back cover attached to said outer housing.

Embodiments of the subject invention substantially eliminate or at least partially address the aforementioned problems in the prior art(s); and enable low profile, simple, convenient to use and efficient warning light.

Additional aspects, advantages, features and objects of the subject invention would be made apparent from the drawings and the detailed description of the illustrative embodiments construed in conjunction with the appended claims that follow.

It will be appreciated that features of the subject invention are susceptible to being combined in various combinations without departing from scope of the subject invention as defined by the appended claims.

BRIEF DESCRIPTION OF ACCOMPANYING DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

FIG. 1 represents an exemplary view of a warning light on a truck lift, in accordance with the prior art.

FIGS. 2A & 2B represents a perspective and exploded view of the warning light on the truck lift respectively, in accordance with the prior art.

FIG. 4 represents an exploded view of the warning light for the truck lift, in accordance with an embodiment of the subject invention.

Figure 3:
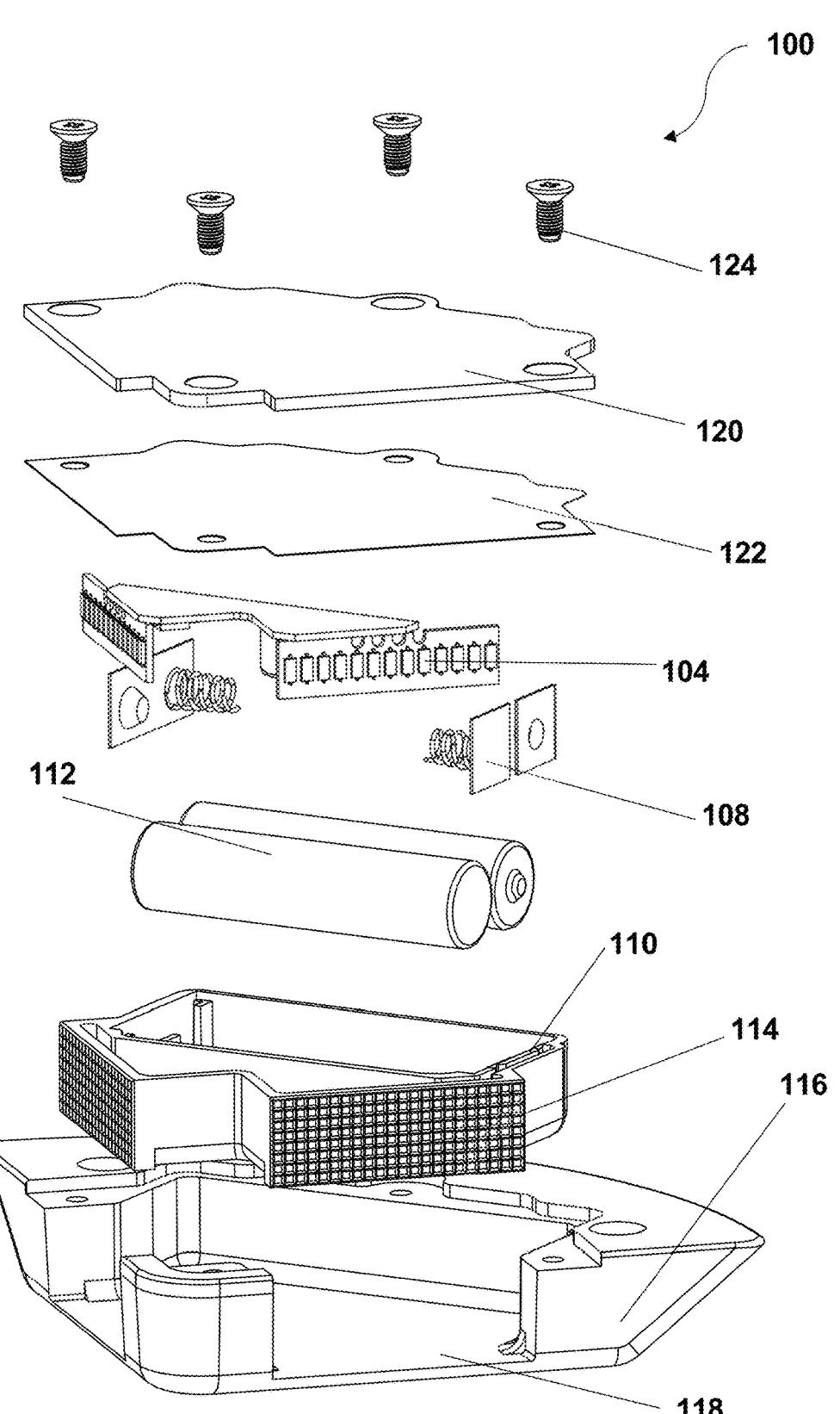
FIG. 3 represents an exploded view of a warning light for a truck lift, in accordance with an embodiment of the subject invention.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS OF INVENTION

The following detailed description illustrates embodiments of the subject invention and ways in which they can be implemented. Although some modes of carrying out the subject invention have been disclosed, those skilled in the art would recognize that other embodiments for carrying out or practising the subject invention are also possible.

The subject invention, in some embodiments thereof, relates to a warning light and, more particularly, to a warning light for a truck lift.

In one aspect, an embodiment of the subject invention provides a warning light for a truck lift comprising:

a PCB pre-formed with a plurality of light emitting diodes LEDs, a tilt switch, electric cables and battery contacts; said plurality of LEDs positioned as two or more sets of LEDs with said sets of LEDs positioned perpendicularly to said PCB;

a tub casing including a battery housing and a plurality of lenses; said tub casing integrated to form a single molded component housing said PCB and said pre-formed components therein;

said tub casing accommodating said battery housing, said plurality of lenses, and said PCB with said pre-formed components being embedded into a cavity in an outer housing, forming an integrated and replaceable single piece molded component; and an open face of said tub casing being sealed by a gasket and a back cover attached to said outer housing.

It is in accordance with an aspect of some embodiments of the subject invention that the present disclosure describes a warning light. According to some embodiments, the warning light may be configured for use, but not limited to, on a tail lift, lifting platform, or liftgate e.g., for a truck, van, bus, wheelchair enabled vehicle, etc.

Throughout the present disclosure, the term "warning light" as used herein refers to a light that is utilized to provide a warning to people that a vehicle is approaching the surrounding area. The warning light may be installed in a hydraulic door with a height that changes according to its position. The door can move up and down within the entire movement range of the side of the truck, according to an embodiment of the subject invention.

According to an embodiment of the subject invention, the warning light may comply with European or USA regulations (e.g., ECE Regulation ECE-R6-2001; R148e; R65). According to some embodiments, the warning light may be clearly visible from behind and/or beside the vehicle, during the day and/or at night, thereby ensuring improved functionality resulting in enhanced security of operation. Furthermore, the warning light may comprise a plurality of light-emitting diode LED lights, in accordance with an embodiment of the subject invention. Optionally, the plurality of LEDs may be mounted in parallel and/or in series. Optionally, the plurality of LEDs may be positioned as two or more sets of LEDs.

The "light-emitting diode" LED as referred to in the context of the subject invention refers to a semiconductor device that emits light when current flows through it. Electrons in the semiconductor recombine with electron holes, releasing energy in the form of photons. The color of the light (corresponding to the energy of the photons) is determined by the energy required for electrons to cross the band gap of the semiconductor. White light is obtained by using multiple semiconductors or a layer of light-emitting phosphor on the semiconductor device.

According to a further embodiment of the subject invention, the LED lights may be covered by a lens. Optionally, the lens may protect the LED lights from the external environment. Optionally, the lens may protect the LED lights from shocks. Optionally, the lens may increase the intensity and/or brightness of the LED lights. Optionally, the lens may adjust the color of the visible light observed from the LED lights; and capable of serving any other advantages as can be perceived by a person skilled in the art and falls within the scope of the subject invention.

It is further in accordance with an embodiment of the subject invention that the warning light may be constant, and/or may blink on and off. Optionally, the warning lights may blink at an optimal frequency in compliance with the regulations ECE Regulation ECE-R6-2001; R148e, as also can be perceived by a person skilled in the art and falls within the scope of the subject invention.

Furthermore, the warning light may include a controller, in accordance with an embodiment of the subject invention. Optionally, the controller may be a printed circuit board PCB. Optionally, the controller may be connected to the plurality of LED lights. Optionally, the controller may control the rate at which the warning light blinks. Optionally, the warning light may be turned on automatically when the lifting platform of the vehicle is in motion. Optionally, the warning light may include a manual override for specific situations, e.g., when an operator identifies a potentially dangerous situation, including any other hazardous situations as can be perceived by a person skilled in the art and considered to be falling within the scope of the subject invention.

The term "controller" as referred to herein in the context of the subject invention may refer to one or more individual controllers, controlling devices and various elements associated with the controller. The controller may control/adjust the operation of the warning light to monitor different functionalities as mentioned above, not to be considered limiting in nature, and include anything that is perceived by a person skilled in the art and considered to be within the scope of the subject invention, thereby improving the performance and reliability of the warning light.

Furthermore, the "printed circuit board" PCB as referred to herein in the context of the subject invention is a medium used to connect components to one another in a circuit. The printed circuit board is a non-conductive material with conductive lines printed or etched. Electronic components are mounted on the board, and traces connect the components together to form a working circuit or assembly.

According to a further embodiment of the subject invention, the warning light may include a tilt switch. Optionally, the tilt switch may be connected to the controller. Optionally, the tilt switch may activate the warning light at a predefined tilt angle of the platform. Optionally, the tilt switch may activate the warning light when the platform is at an angle to the vertical ranging between about 20° to about 90°, and/or between about 30° to about 60°, and/or between about 40° to about 50°, or within any other possible range as can be perceived by a person skilled in the art and considered to be falling within the scope of the subject invention. Preferably, the tilt switch may activate the warning light when the platform is at an angle of 45° to the vertical. "About 45°" as used herein means within 5% of 45°. This definition may apply to any other angle or value described herein. For example, "about 50°" means within 5% of 50°.

It is further in accordance with an embodiment of the subject invention that the warning light may include a tub casing. Optionally, the tub casing may include a mount for one or more batteries e.g., AAA batteries, AA batteries, etc. Optionally, the tub casing may include one or more lenses. Optionally, the tub casing may include one or more mounts for the controller and/or the plurality of LED lights.

The term "casing" as used herein refers to a protective enclosure, that is formed as a single molded component accommodating the printed circuit board (PCB) and various other components pre-formed within the printed circuit board. Optionally, the casing is fabricated from metal, non-metal, plastic, composites, and the like. Beneficially, the casing is to protect the internal components of the warning light from damage, contamination, and environmental hazards. The casing further helps to maintain the alignment and positioning of different components of the warning light embedded within. Additionally, the casing may help provide a simpler installation/alignment of the components within, thereby ensuring convenient use and operation.

The term "battery" as referred to herein in the context of the subject invention refers to a device that converts chemical energy contained within its active materials directly into electric energy by means of an electrochemical oxidation-reduction (redox) reaction. This type of reaction involves the transfer of electrons from one material to another via an electric circuit.

Further, the tub casing may include one or more passages and or cavities and/or mounts to hold one or more components of the warning light, e.g., LED lights, controller, conducting cables, batteries, battery contacts, etc, in accordance with an embodiment of the subject invention. Optionally, the tub casing may include a battery housing and one or more lenses. Optionally, the tub casing may be molded into various shapes, e.g., bath shaped, etc. "Bath shaped" as used herein means any concave shape with a rim extending around a perimeter. Optionally, the tub housing may be shaped to fit and/or accommodate the various components. Optionally, the tub housing may be cast, molded, and/or thermoformed. Optionally, the tub casing may be composed of a thermoset plastic, ceramic, metal, etc., or a combination thereof. Preferably, the tub and lenses are all a single molded component (e.g., of transparent plastic).

According to a further embodiment of the subject invention, the tub casing may be partially and/or completely enclosed within an outer housing. Optionally, the outer housing may include one or more cavities. Optionally, the tub casing may fit into a cavity of the outer housing. Optionally, the cavities may be configured to house one or more components of the warning light. Optionally, the outer housing may include one or more openings through which the light from the LED lights may shine. Optionally, the outer housing may include one or more openings into which various components of the warning light may fit, e.g., lenses, tub casing, batteries, battery contacts, etc. Optionally, the outer housing may be composed of metal, ceramic, thermoset plastic, etc., or a combination thereof. Optionally, the outer housing may be composed of a metal, such as aluminum and/or aluminum alloy, or any other suitable material as can be perceived by a person skilled in the art. Optionally, the outer housing may be reflective. Optionally, the outer housing may include one or more light reflectors, or any other possible alternatives and/or configurations as can be perceived by a person skilled in the art and considered to be within the scope of the subject invention.

It is further in accordance with an embodiment of the subject invention that the outer housing may include a removable back cover. Optionally, the back cover may be attached to the outer housing, e.g., by screws, etc. Optionally, the back cover may seal the outer housing and/or the tub casing against penetration of water, dust, contamination, etc., thereby ensuring safety and security of operation.

Furthermore, the outer housing may include a gasket, in accordance with an embodiment of the subject invention. Optionally, the gasket may be attached to the outer housing. Optionally, the gasket may be attached to the tub casing. Optionally, the gasket may be attached to the back cover. Optionally, the gasket may seal the outer housing and/or the tub casing against penetration of water, dust, contamination, etc. For example, the gasket may seal the rim of the tub against the outer housing (e.g., an inner surface of the outer housing and/or the back cover), including any other possible configuration(s) as can be perceived by a person skilled in the art and considered to be within the scope of the subject invention.

It will be appreciated that the term "gasket" as referred to herein in the context of the subject invention describes a mechanical seal which fills the space between two or more mating surfaces, generally to prevent leakage from or into the joined objects while under compression. It is a deformable material that is used to create a static seal and maintain that seal under various operating conditions in a mechanical assembly.

Moreover, in accordance with a further embodiment of the subject invention, the outer housing may have a low profile, e.g., having a maximum height ranging between about 0.5 cm to about 5 cm, and/or between about 1 cm to about 3 cm, and/or between about 1.5 cm to about 2.5 cm, or within any other possible range as can be perceived by a person skilled in the art. Furthermore, the outer housing may be considered to be triangular, circular, rectangular, square, hexagonal, and/or any other possible shape, in accordance with an embodiment of the subject invention.

In accordance with a further embodiment of the subject invention, the warning light may be highly shock proof, for example, it may not break and/or be dislodged when it receives an impact from cargo being loaded and/or off loaded from the truck lift. Furthermore, the warning light is considered to have a low profile. The warning light's low profile may not interfere with loading and unloading cargo from the truck lift. Additionally, the low profile may help reduce the number and/or strength of impacts acting on the warning light, thereby aiding in the warning light being sturdy and efficient in operation. A top surface of the warning light may be flush with a top surface of a truck lift on which the warning light is implemented. Alternatively, a top surface of the warning light may be recessed relative to a top surface of a truck lift on which the warning light is implemented.

According to a further embodiment of the subject invention, the warning light may be weatherproof in nature. Optionally, the warning light may work reliably in all kinds of weather and/or may not be damaged by any kind of weather. Optionally, the warning light may be configured to be waterproof, for example, to keep water away from electrical components of the warning light, thereby improving the operationality and overall working expectancy. Further, the warning light may be heat and/or cold resistant, for example, the warning light may be configured to function at temperatures as extreme as ranging between about −35° C. to about +70° C., including any other feasible ranges within the scope of the subject invention.

Furthermore, the warning lights may be attached to a tail lift, for example, by screws, glue, welding, etc., or any combination or suitable arrangement thereof. The warning light may be installed in a hydraulic door whose height changes according to its position. The door can move up and down within the entire movement range of the side of a truck, in accordance to an embodiment of the subject invention.

In accordance with a further embodiment of the subject invention, the warning light may be activated automatically when a tail lift platform is extended e.g., rotated downward. Further, the warning light may be deactivated when the tail lift platform is fully retracted and/or secured (e.g., when the lift is rotated to its raised vertical position, the warning lights turn off; and when the lift is lowered rotating to its horizontal working position, the warning lights turn on). Optionally, the warning lights include a tilt switch which may turn the lights on and/or off at an angle e.g., at an angle of about 45°.

DETAILED DESCRIPTION OF ACCOMPANYING DRAWINGS

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Referring FIG. 3, illustrated is an exploded view of a warning light (100) for a truck lift, in accordance with an embodiment of the subject invention. The warning light (100) may include a PCB. Optionally, the PCB may be pre-formed with electronics, two or more sets of light-emitting diodes LEDs (104), a tilt switch, and battery contacts (108). Optionally, the two or more sets of LEDs (104) may be at 90° angles to each other. Optionally, the PCB may fit into a tub casing (110). The tub casing may comprise a single piece of molded plastic. Optionally, the plastic tub casing may be transparent. For example, the lens through which the LED's can be seen may be part of the tub casing itself. Thus, the LED's (104) may be enclosed in the tub casing (110) and/or shine outward through the wall of the tub casing. Accordingly, a single piece molded casing may include a cavity for batteries (112), a cavity for the LED (104), a cavity for the PCB and/or a lens (114) for the LED's. The sealing of the tub casing (110) may protect the LEDs (104), the PCB and/or the batteries (112) from external hazards (e.g., moisture, dust, contamination, etc.). Optionally, the plastic tub casing (110) may be clear and/or tinted, e.g., tinted amber. Optionally, the tub casing (110) may include mounts and/or cavities for the various components, LEDs, batteries, etc. Optionally, the tub casing (110) may include an open face, i.e., it may be configured for easy access to the PCB, batteries (112), etc. Optionally, the warning light (100) may include an outer housing (116). Optionally, the outer housing (116) may be composed of metal (e.g., aluminum). The warning light (100) for a truck lift is powered by at least one battery (112).

The outer housing (116) may include a cavity (118) for the plastic tub casing (110) and/or holes out through which the LEDs (104) may shine. Optionally, the outer housing (116) may include a removable back cover (120). Optionally, the back cover (120) may be composed of metal (e.g., aluminum), and/or plastic, etc. Optionally, the warning light (100) may include a flexible and/or elastic gasket (122). Optionally, the gasket (122) may be located between the opening of plastic casing and the metal base and/or the metal cover. Optionally, the gasket (122) may be composed of silicon, rubber, elastomer, and/or a combination thereof.

Figure 4:
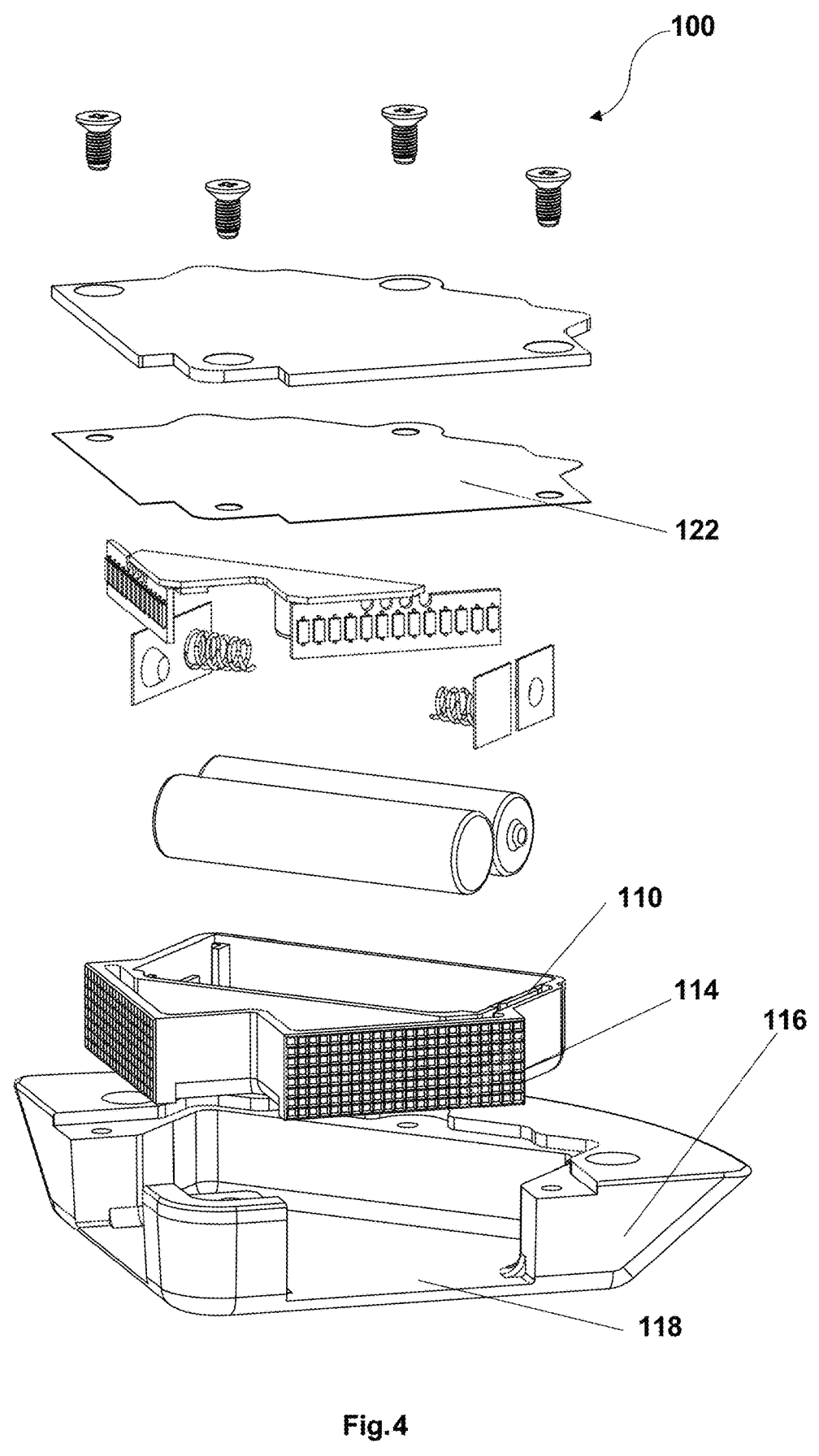

FIG. 4 represents an exploded view of the warning light (100) for the truck lift, in accordance with an embodiment of the subject invention. The tub casing (110) may be positioned inside the mount and/or cavity (118) in the outer housing (116). Optionally, the outer housing (116) includes mounts, cavities, and/or channels designed to accommodate various components of the warning light (100). Optionally, the warning light may come in a variety of sizes, in accordance with the scope of the subject invention.

Further, the warning light (100) includes a PCB. Optionally, the PCB may be pre-formed with electronics, two or more sets of LEDs, a tilt switch, and battery contacts. Optionally, the two or more sets of LEDs may be at 90° angles to each other. Optionally, the PCB may fit into a tub casing (110). The tub casing (110) may comprise a single piece of molded plastic. Optionally, the plastic tub casing may be transparent. Optionally, the plastic tub casing may be clear and/or tinted, e.g., tinted amber. Optionally, the tub casing (110) may include mounts and/or cavities for the various components, e.g., lenses, LEDs, batteries, etc. Optionally, the tub casing (110) may include an open face i.e., it may be configured for easy access to the PCB, batteries, etc. Optionally, the warning light (100) may include an outer housing (116). Optionally, the outer housing (116) may be composed of metal (e.g., aluminum). Optionally, the outer housing (116) may include a cavity (118) for the plastic tub casing (110) and/or holes out through which the LEDs may shine. Optionally, the outer housing (116) may include a removable back cover. Optionally, the back cover may be composed of metal (e.g., aluminum), and/or plastic, etc. Optionally, the warning light (100) may include a flexible and/or elastic gasket (122). Optionally, the gasket (122) may be located between the opening of the plastic tub casing and the metal base and/or the metal cover. Optionally, the gasket (122) may be composed of silicon, rubber, elastomer, and/or a combination thereof. Optionally, the back cover may be lined with the gasket (122). For example, the gasket (122) may seal between the lip of the opening of the plastic tub casing (110) and the outer housing (116) and/or cover. In some embodiments, the tub casing (110) and inside components may easily be replaced. For example, if a component fails, the entire tub casing and/or its contents may be replaced as a single piece. Alternatively or additionally, only the batteries may be replaced, upon fault.

Figure 5:
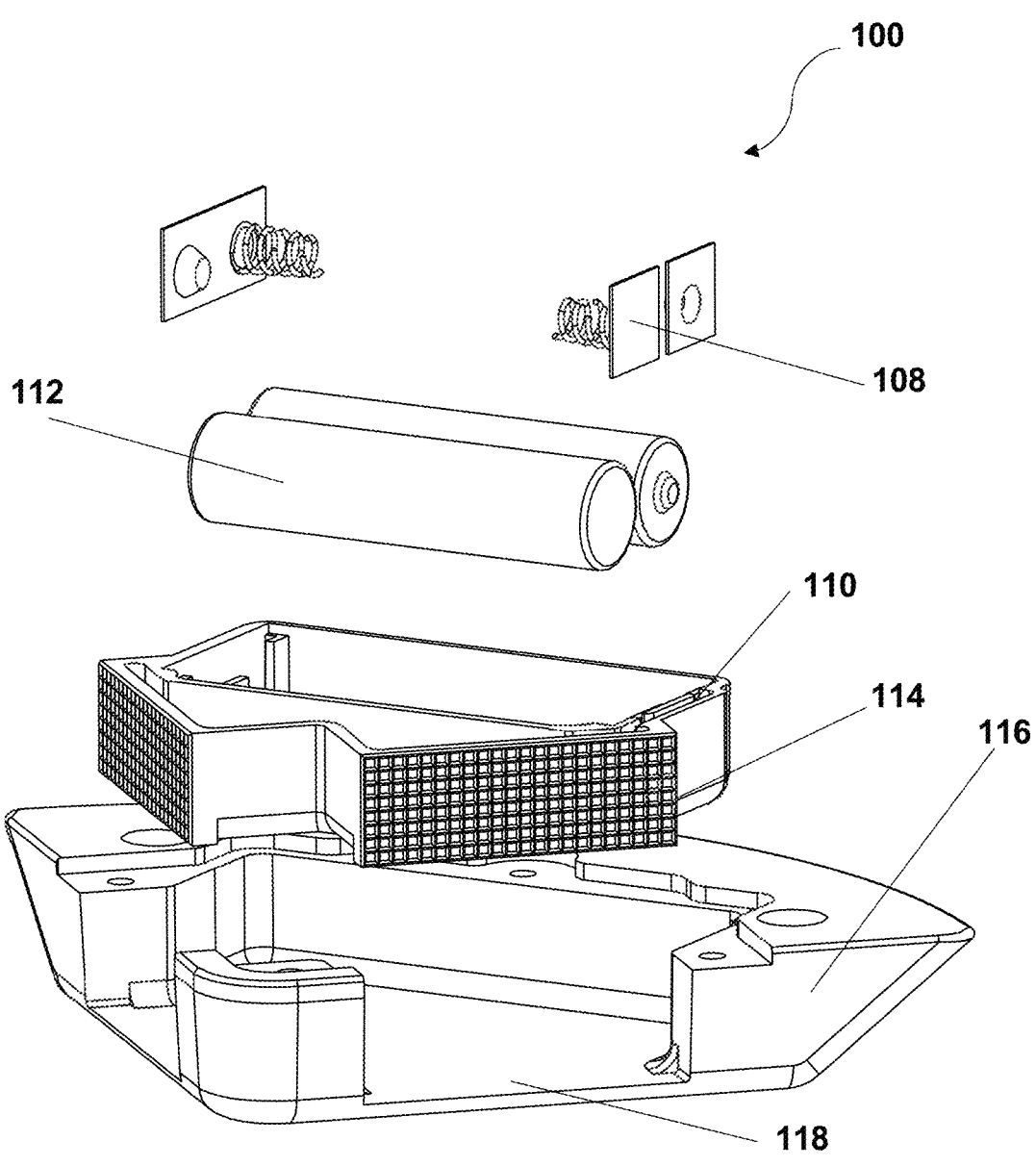
FIG. 5 represents a perspective view of the warning light for the truck lift, in accordance with an embodiment of the subject invention.

As shown in FIG. 5, a perspective view of the warning light (100) for the truck lift is depicted in accordance with an embodiment of the subject invention. Accordingly, the warning light (100) includes a PCB. Optionally, the PCB may be pre-formed with electronics, two or more sets of LEDs, a tilt switch, and battery contacts (108). Optionally, the two or more sets of LEDs may be at 90° angles to each other. Optionally, the PCB including the LED's and/or the tilt switch may fit into a tub casing (110). The tub casing (110) may comprise a single piece of molded plastic. Optionally, the tub casing (110) may include mounts and/or cavities for various components and/or lenses of the warning light. For example, the PCB, LEDs, batteries, etc. may be fitted within the respective cavities. Optionally, the tub casing (110) may include an open face i.e., it may be configured for easy access to the PCB, batteries, etc. Optionally, the warning light (100) may include an outer housing (116). Optionally, the outer housing (116) may be composed of metal (e.g., aluminum). Optionally, the outer housing (116) may include a cavity (118) for the plastic tub casing (110) and/or holes out through which the LEDs may shine. Optionally, the outer housing (116) may include a removable back cover. Optionally, the back cover may be composed of metal (e.g., aluminum), and/or plastic, etc. Optionally, the warning light (100) may include a flexible and/or elastic gasket. Optionally, the gasket may be located between the opening of the plastic tub casing and the metal base and/or the metal cover. Optionally, the gasket may be composed of silicon, rubber, elastomer, and/or a combination thereof. Optionally, the back cover may be lined with the gasket. Optionally, the back cover may be tightened to the outer housing (116), e.g., by screws. Optionally, tightening the back cover may seal the open face of the tub casing (110) to the gasket. Optionally, the plastic tub casing (110) may be placed into the outer housing (116) with the opening of the casing facing outward. Optionally, the back cover may include a gasket that seals the opening of the tub casing (110). Alternatively, or additionally, the gasket may be on the outer housing (116), and the tub casing (110) may be placed with its opening facing the gasket and/or the outer housing (116). Optionally, tightening the back cover may press the open face of the tub casing (110) against the gasket and/or the outer housing (116).

Figure 6:
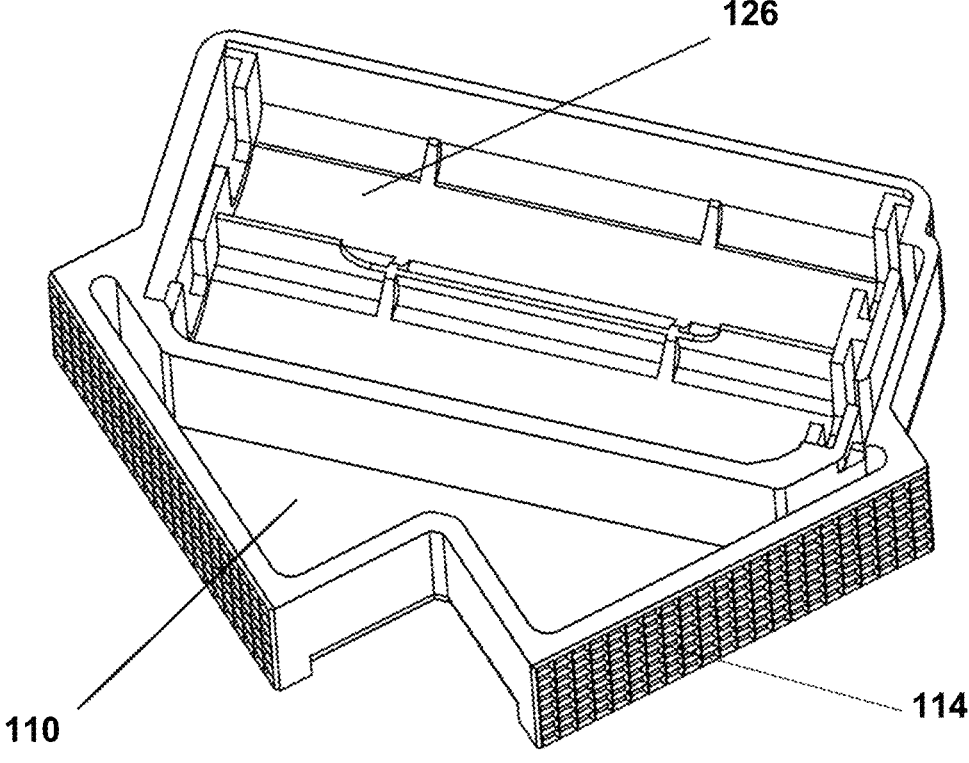
FIG. 6 represents a schematic view of a tub casing, in accordance with an embodiment of the subject invention.

FIG. 6 represents a schematic view of the tub casing (110), in accordance with an embodiment of the subject invention. The tub casing (110) may include one or more passages and or cavities and/or mounts to hold one or more components of the warning light, e.g., LED lights, controller, conducting cables, batteries, battery contacts, etc. Optionally, the tub casing (110) may include a battery housing (126) and one or more lenses (114). Optionally, the tub casing (110) may be molded into various shapes, e.g., bath shaped, etc. Optionally, the tub housing (110) may be shaped to fit and/or accommodate various components of the warning light (100). Optionally, the tub housing (110) may be cast, molded, and/or thermoformed. Optionally, the tub casing (110) may be composed of a thermoset plastic, ceramic, metal, etc., or any combination thereof. Optionally, the tub casing (110) may form a single piece of molded plastic. Optionally, the plastic tub casing (110) may be transparent. Optionally, the plastic tub casing (110) may be clear and/or tinted, e.g., tinted amber. Optionally, the tub casing (110) may include mounts and/or cavities for various components, e.g., lenses, LEDs, batteries, etc. Optionally, the tub casing (110) may include an open face i.e., it may be configured for easy access to the PCB, batteries, etc. Optionally, the batteries may be easily replaced and/or the entire tub casing (110) and/or electronics may be removed from the outer housing and easily replaced, in the event of malfunctioning of any component.

According to a particular embodiment of the subject invention, the entire tub casing (110) may be transparent. Optionally, the tub casing (110) consists of a single piece of molded plastic with one open face. Optionally, the tub casing (110) (e.g., a wall thereof) may serve as a mount for the PCB and as a window pane (e.g., lens for the LED). Optionally, the tub casing (110) may be completely sealed by sealing the open face of the tub casing.

Figure 7:
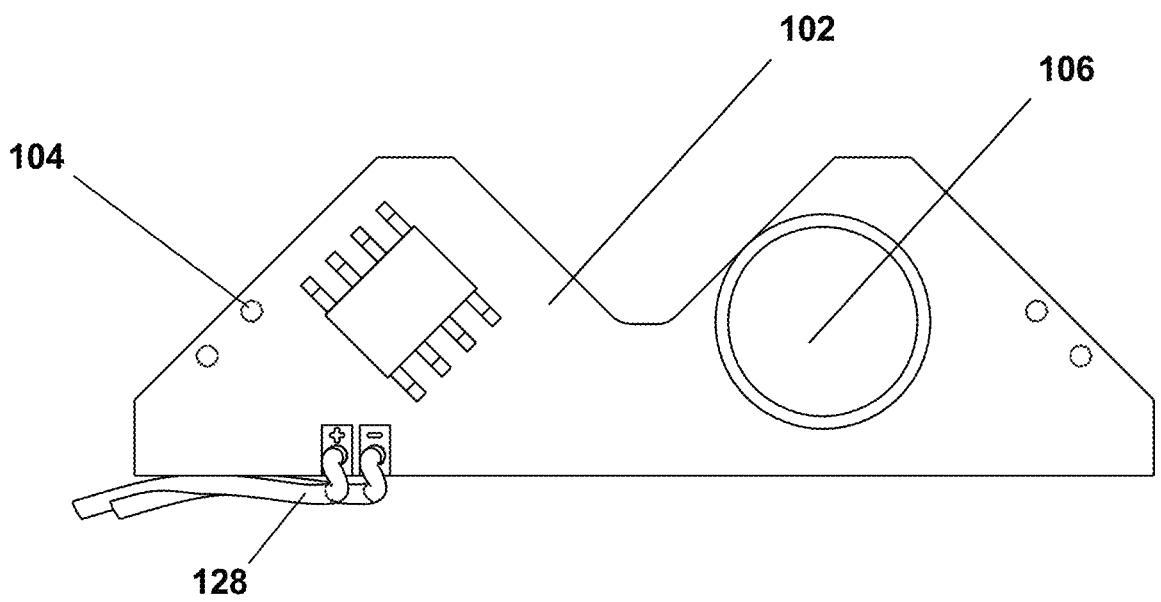
FIG. 7 represents a schematic view of a printed circuit board PCB, in accordance with an embodiment of the subject invention.

Referring FIG. 7, a schematic view of a printed circuit board PCB (102) is represented in accordance with an embodiment of the subject invention. As such, the PCB (102) may include pre-formed electronics, two or more sets of LEDs (104), a tilt switch (106), cables (128), and/or battery contacts. Optionally, the tilt switch (106) may be connected to the PCB (102). Optionally, the tilt switch (106) may activate the warning light at a predefined tilt angle of the platform. Optionally, the tilt switch (106) may activate the warning light when the platform is at an angle to the vertical ranging between about 20° to about 90°, and/or between about 30° to about 60°, and/or between about 40° to about 50°. Preferably, the tilt switch (106) may activate the warning light when the platform is at an angle of 45° to the vertical.

Figure 8:
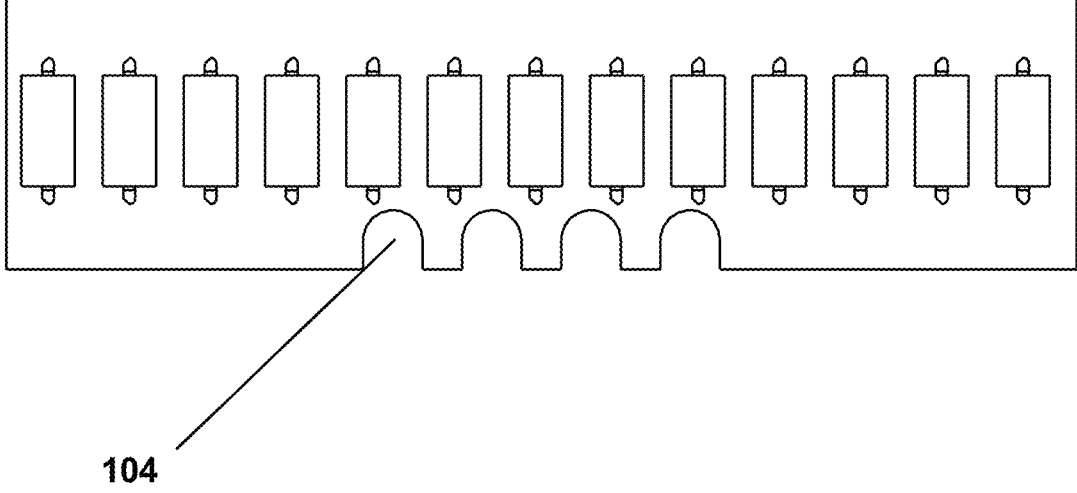
FIG. 8 represents a schematic view of a LED set up, in accordance with an embodiment of the subject invention.

FIG. 8 represents a schematic view of a LED (104) set up, in accordance with an embodiment of the subject invention. Accordingly, a set of a plurality of LEDs (104) may be located on an outer side of the PCB. Optionally, the sets of LEDs (104) may be positioned perpendicularly to the PCB. Optionally, each set of LEDs (104) may include 2, 3, 4, 5, 6, 7, 8, 9, 10, 11, 12, 13, 14, 15, 20, 25, 30, etc. LEDs, e.g., not limited to, 13 LEDs on each side, or each set including any other number of LEDs as can be perceived by a person skilled in the art and within the scope of the subject invention. Optionally, each LED (104) may have a power ranging between about 0.01 W to about 1 W, and/or between about 0.05 W to about 0.5 W, and/or between about 0.1 W to about 0.3 W, or any other possible range within the reasonable scope of the subject invention. Preferably, each LED (104) may have a power of 0.2 W. Optionally, each set of LEDs (104) may have a power ranging between about 0.25 W to about 50 W, and/or between about 1 W to about 15 W, and/or between about 2.5 W to about 10 W, or any other possible range within the reasonable scope of the subject invention.

Figure 9:
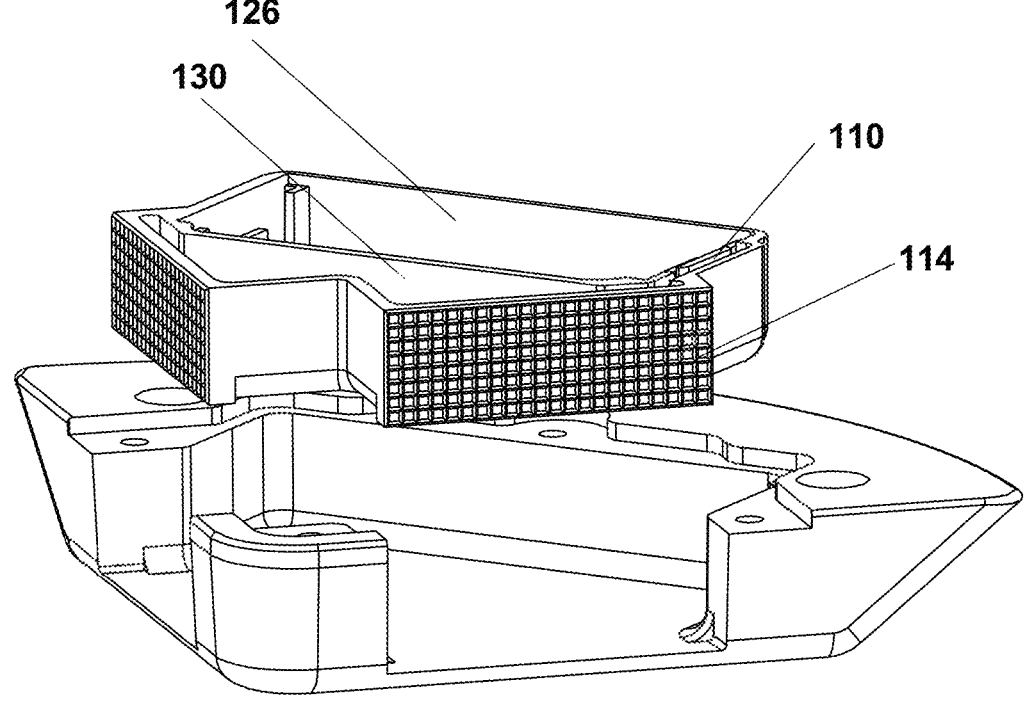
FIG. 9 represents a schematic view of a disassembled outer housing, tub casing, and lens, in accordance with an embodiment of the subject invention.

Referring FIG. 9, an exemplary view of a disassembled printed circuit board PCB and tub casing (110) is represented in accordance with an embodiment of the subject invention. The warning light may include a PCB which may be pre-formed with a plurality of LEDs, a tilt switch, electric cables, and/or battery contacts. The tub casing (110) may comprise a single piece of molded plastic. Optionally, the plastic tub casing (110) may be transparent. Optionally, the plastic tub casing (110) may be clear and/or tinted, e.g., tinted amber. Optionally, the tub casing (110) may include mounts and/or cavities for various components of the warning light (100), e.g., lenses, LEDs, batteries, etc. Optionally, the tub casing (110) may include lenses (114), a battery housing (126), channels for electric wiring, and a cavity for the PCB (130).

Figure 10:
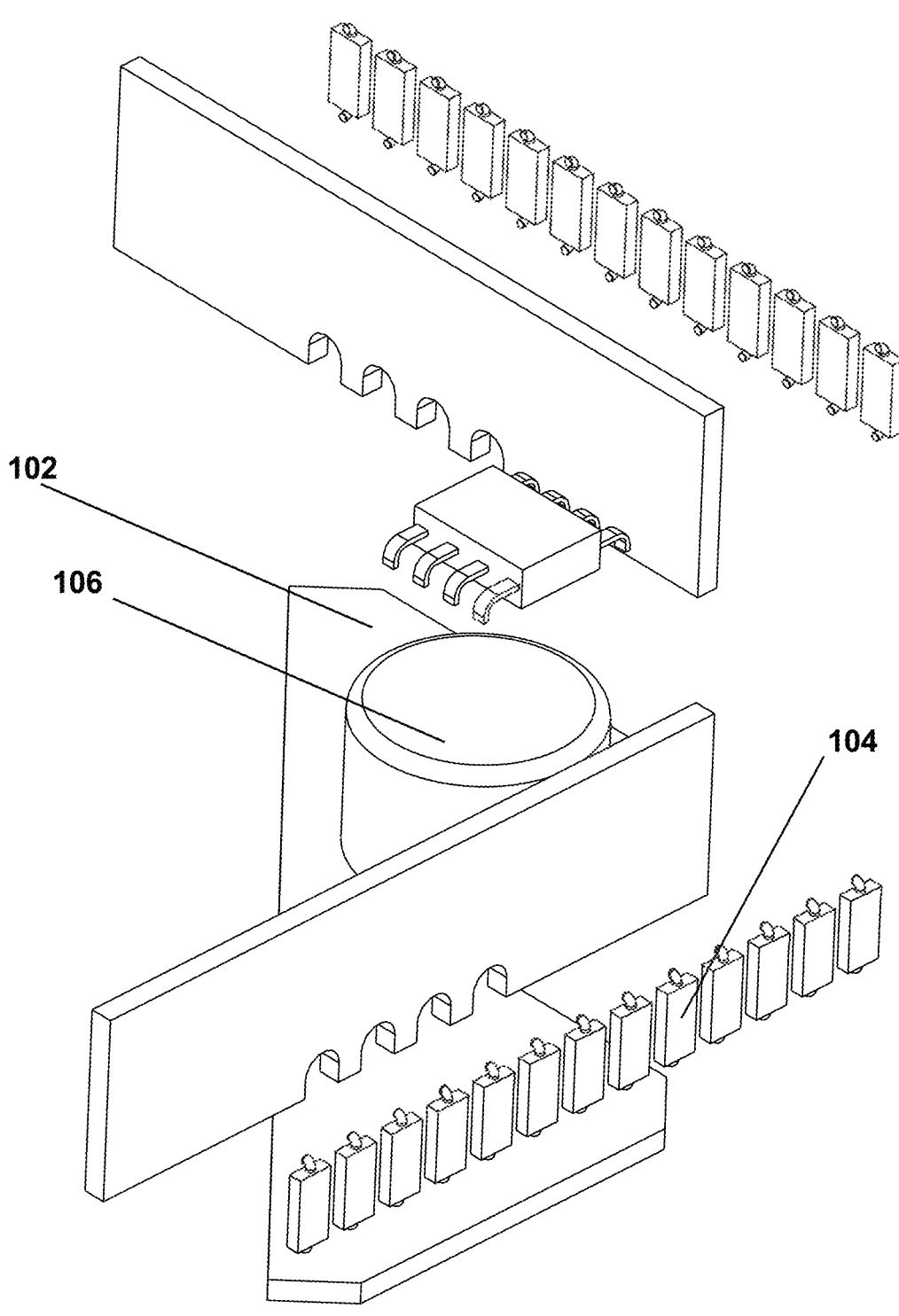
FIG. 10 represents an expanded view of the printed circuit board PCB and tub casing, in accordance with an embodiment of the subject invention.

Further, FIG. 10 represents an expanded view of the printed circuit board PCB (102) and tub casing, in accordance with an embodiment of the subject invention Accordingly, the warning light may include a plurality of light emitting diodes LED lights (104) and a tilt switch (106). Optionally, the plurality of LEDs (104) may be mounted in parallel and/or in series. Optionally, the plurality of LEDs (104) may be positioned as two or more sets of LEDs.

Moreover, the tub casing may include one or more passages and or cavities and/or mounts to fit one or more components of the warning light, e.g., LED lights, PCB, conducting cables, batteries, battery contacts, etc. Optionally, the tub casing may include a battery housing and one or more lenses. Optionally, the tub casing may be molded into various shapes, e.g., bath shaped, etc.

Furthermore, the tub casing may include one or more passages and or cavities and/or mounts to fit one or more components of the warning light, e.g., LED lights, PCB, conducting cables, batteries, battery contacts, etc. Optionally, the tub casing (110) may include a battery housing and one or more lenses. Optionally, the tub casing may be molded into various shapes, e.g., bath shaped, etc. Optionally, the PCB (102) may be positioned in the mounts and/or cavities provided in the tub casing.

Furthermore, the entire tub casing may be considered to be transparent in appearance. Optionally, the plastic tub casing may be clear and/or tinted, e.g., tinted amber.

Additionally, the tub casing may include mounts and/or cavities for various components of the warning light, e.g., lenses, LEDs, batteries, etc. Optionally, the casing may serve as a mount for the PCB (102) and as a window pane and/or lens for an outer housing. Optionally, the tub casing consists of a single piece of molded plastic with one open face. Optionally, the tub casing may be completely sealed by sealing the open face thereof. Optionally, the open face of the tub casing is configured to provide an easy access to the PCB, batteries, etc. Optionally, the batteries may be easily replaced and/or the entire tub casing and/or electronics thereto may be removed from the outer housing and suitably replaced, in the event of any malfunction. Optionally, the battery contacts may be held independently and/or the wires may be strung along a wire path. Optionally, the tub casing may include a mount for one or more batteries e.g., AAA batteries, AA batteries, etc.

Figure 11:
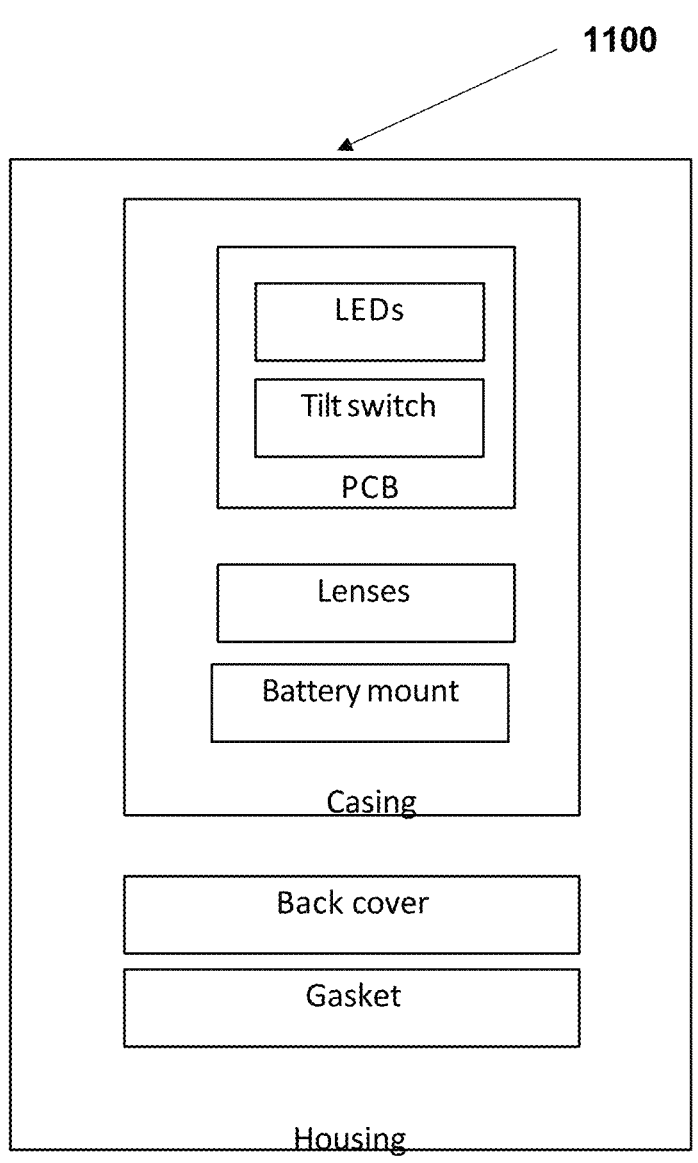
FIG. 11 represents a block diagram of a warning light for a truck lift, in accordance with an embodiment of the subject invention.

According to an embodiment of the subject invention, FIG. 11 represents a block diagram (1100) of a warning light, highlighting the components therein. As shown, the warning light may include a PCB which may be pre-formed with a plurality of LEDs, a tilt switch, electric cables and/or battery mounts. The PCB may fit within a tub casing. The tub casing may include a cavity shaped and/or sized for one or more batteries and/or the PCB. The tub casing may include one or more lenses. The tub casing may include an open face and may further fit within a cavity of an outer housing. The open face of the tub casing may be sealed by a gasket and/or a back cover which may be attached to the outer housing, e.g., by screws.

Figure 12:
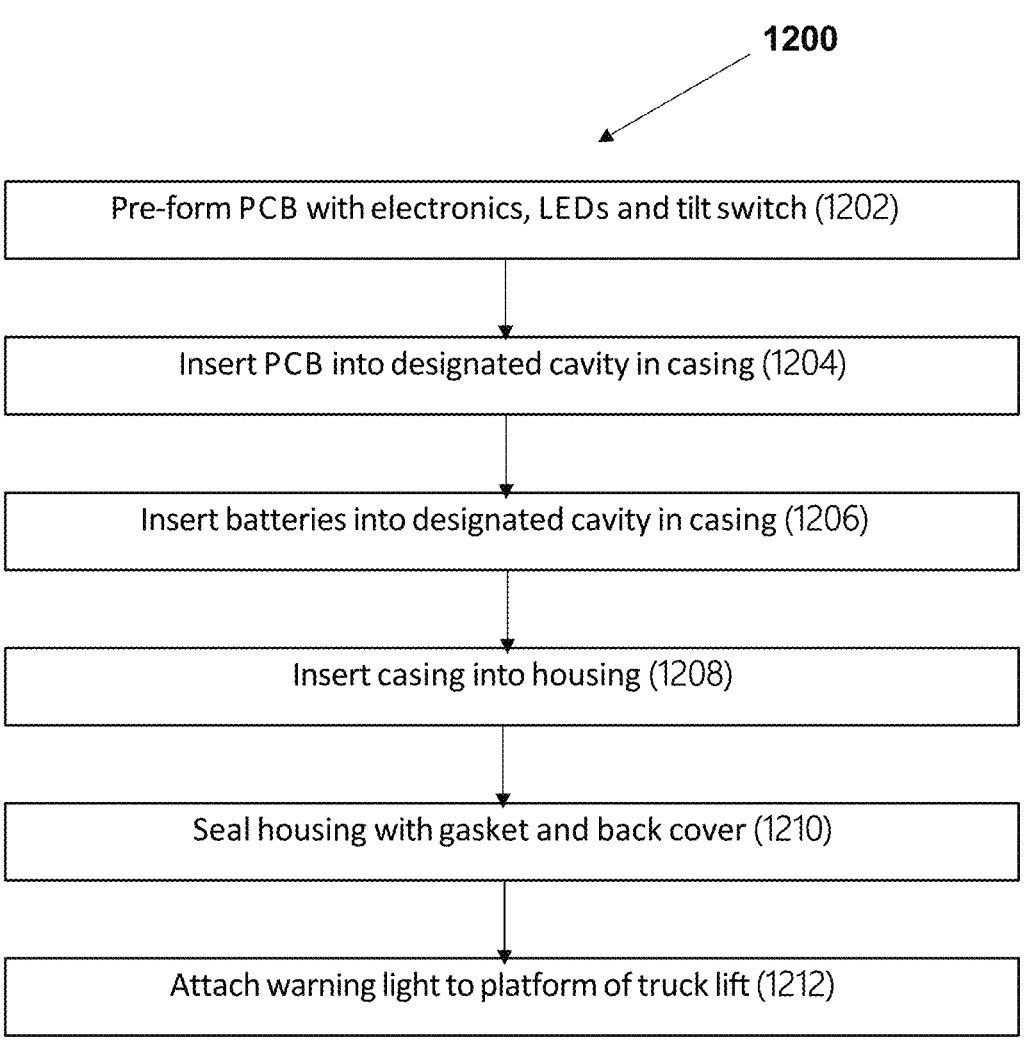
FIG. 12 represents a flow chart for installation of a warning light for a truck lift, in accordance with an embodiment of the subject invention.

According to a further embodiment of the subject invention, FIG. 12 depicts a flow chart (1200) for installation of a warning light for a truck lift. As depicted in the flowchart, at step (1202) a PCB may be pre-formed with electronics, a plurality of LEDs, a tilt switch, and/or battery contacts. At step (1204), the PCB may be inserted into a designated cavity in a tub casing. The tub casing may further include one or more lenses which may suitably focus, adjust, enhance, tint, and/or protect the LEDs. Further, at step (1206) one or more batteries may be inserted into a designated cavity in the tub casing. The batteries may contact the battery contacts of the PCB. At step (1208), the tub casing is inserted into the outer housing. The tub casing may include an open face and configured to be inserted into a cavity in an outer housing. The lenses may further fit into one or more openings in the outer housing. At step (1210), the tub casing may be sealed within the outer housing with a gasket and a back plate. The gasket may be configured to prevent entrance of water, dust, and/or any other contaminants, etc. into the tub casing. Lastly, at step (1212) the warning light may be attached to the lift platform of a truck by screws, glue, welding, or any other suitable means, etc.

These embodiments are provided by way of example and are in no means intended to be limiting the scope of the invention.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

It is expected that during the life of a patent maturing from this application many relevant building technologies, artificial intelligence methodologies, computer user interfaces, image capture devices will be developed and the scope of the terms for design elements, analysis routines, user devices is intended to include all such new technologies a priori.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method, or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

As used herein, the term "plurality" relates to 2, 3, 4, 5, 6, 7, 8, 9, 10, 11, 12, 13, 14, 15, 20, 25, 30, 40, 50, 100, 500, 1,000, etc., or any sub-range therebetween.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may additionally be provided in combination in a single embodiment. Conversely, various features of the invention, which are, for brevity, described in the context of a single embodiment, may additionally be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent, or patent application was specifically and individually indicated to be incorporated herein by reference. In addition, citation, or identification of any reference in this application shall not be construed as an admission that such reference is available as prior art to the subject invention. To the extent that section headings are used, they should not be construed as necessarily limiting.

I claim:

1. A warning light for a truck lift comprising:
an outer housing comprising a cavity;
a back cover removably attached to the outer housing;
a tub casing removably configured within the cavity of the outer housing, the tub casing existing as a single, monolithic unit comprising:

a battery housing; and
a plurality of lenses;
a PCB removably configured within the tub casing, the PCB comprising:
a plurality of LEDs;
a tilt switch;
electric cables; and
battery contacts;
at least one battery removably configured within the battery housing; and
a gasket configured between the tub casing and the back cover and serving as a barrier preventing the tub casing, PCB, and at least one battery from contacting the back cover, wherein removal of the tub casing from the cavity of the outer housing results in removal of the PCB and the at least one battery from the cavity of the outer housing.

2. The warning light for a truck lift as claimed in claim 1, wherein the gasket serves as a barrier preventing water from entering the cavity of the outer housing.

3. The warning light for a truck lift as claimed in claim 1, wherein said warning light is amber in color.

4. The warning light for a truck lift as claimed in claim 1, wherein each LED of said plurality of LEDs comprises a power of 0.2 W.

5. The warning light for a truck lift as claimed in claim 1, wherein said tilt switch is used for turning said plurality of LEDs on and off when the tilt switch is configured at an angle of about 45° from vertical.

6. The warning light of claim 1, wherein the tub casing is retained within the cavity of the outer housing by geometric conformity between the tub casing and the cavity.

7. A method for installation of a warning light for a truck lift, comprising the steps:
forming a PCB with a plurality of components comprising:
a plurality of LEDs;
a tilt switch;
electric cables; and
battery contacts;
forming a tub casing as a single, monolithic unit comprising:
a battery housing; and
a plurality of lenses;
providing at least one battery;
removably housing the PCB and the at least one battery into the tub casing, thereby integrating to form a single component;
removably configuring the tub casing into a cavity in an outer housing whereby removal of the tub casing from the cavity of the outer housing results in removal of the PCB and the at least one battery from the cavity of the outer housing;
forming a warning light by sealing an open face of the tub casing by a gasket and a back cover attached to the outer housing whereby the gasket serves as a barrier preventing the tub casing, PCB, and at least one battery from contacting the back cover; and
attaching the warning light to a platform of a truck lift.

* * * * *